United States Patent Office

2,841,588
Patented July 1, 1958

2,841,588

EXOCYCLIC =NH GROUP AND =S ATOM SUBSTITUTED PYRROLIDINES AND PIPERIDINES, THEIR ACID SALTS, AND METHODS FOR THEIR PREPARATION

Edward G. Howard, Jr., Hockessin, Del., assignor to E. I. du Pont de Nemours and Company, Wilmington, Del., a corporation of Delaware No Drawing. Application July 21, 1955
Serial No. 523,620

21 Claims. (Cl. 260—293.4)

This invention relates to new nitrogen-containing heterocyclic compounds and to methods for their preparation. More particularly this invention relates to novel nitrogen-containing heterocyclic compounds having a substituted piperidine, pyridine, pyrrolidine or pyrrole structure and methods for their preparation.

Heterocyclic compounds which contain nitrogen and have a total of five to six nuclear atoms are of considerable interest, particularly since compounds containing such nuclei are found in many natural products or exhibit biological activity. In general, synthesis of such heterocyclic compounds requires several steps when readily available compounds are employed. Pyrroles or pyridines containing mercapto groups (or the tautomeric thioxopyrrolidine or thioxopiperidine) have hitherto received little attention due to the lack of a good synthetic method.

It is an object of this invention to provide new nitrogen-containing heterocyclic compounds and methods for their preparation. A further object is to provide new nitrogen-containing heterocyclic compounds having a substituted piperidine, pyridine, pyrrolidine or pyrrole structure and methods for their preparation. Other objects will appear hereinafter.

These and other objects of this invention are accomplished by providing new nitrogen-containing heretocyclic compounds, in the form of their free bases and acid salts, which have a five to six membered heterocyclic ring consisting of carbon atoms and one nitrogen atom wherein the ring carbons bonded to ring nitrogen bear respectively an exocyclic nitrogen atom and an exocyclic sulfur atom, and the remaining ring carbons each bear at most one monovalent substituent free from active hydrogen. The new compounds of this invention are nitrogen-containing heterocyclic compounds which have one nitrogen atom and four to five carbon atoms in the heterocyclic ring and have the nuclear carbons which are adjacent to the nuclear nitrogen directly attached respectively to an exocyclic nitrogen atom and to an exocyclic sulfur atom. These compounds preferably contain only hydrogen in addition to carbon, nitrogen and sulfur.

These novel compounds have as a portion of the heterocyclic ring the unit

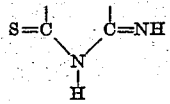

with the remaining portion consisting of a diradical having a two to three atom chain, in which the chain atoms are carbon, attached to and separating the ring carbons adjacent to ring nitrogen. This diradical can be an alkylene radical having a chain of two to three carbon atoms, such as ethylene or trimethylene, or each carbon atom of such diradical can have at most one further radical, of preferably not over eight carbons, laterally attached thereto, i. e., the diradical has the grouping (CHR)$_{2-3}$ wherein the R's are free from active hydrogen, e. g., hydrogen, hydrocarbon, or hydrocarbon having ether, including thioether groups, and preferably not more than one of the R's in the two to three CHR groups are hydrocarbon or substituted hydrocarbon.

One class of these nitrogen-containing heterocyclic compounds contains the piperidine nucleus and can be represented by the formula

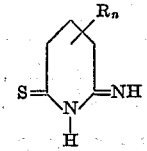

wherein R is a monovalent hydrocarbon radical or a monovalent ether, including thioether containing hydrocarbon radical, such as alkyl, alkoxy, alkylthio, or aryl, preferably of not more than eight carbon atoms, $n$ is a cardinal number of 0 to 3 and each ring carbon bears at most one monovalent substituent. The second class of these nitrogen-containing heterocyclic compounds contains the pyrrolidine nucleus and can be represented by the formula

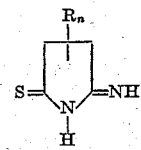

wherein R is a monovalent hydrocarbon radical or a monovalent ether, including thioether containing hydrocarbon radical, such as alkyl, alkoxy, alkylthio, or aryl, preferably of not more than eight carbon atoms, $n$ is a cardinal number of 0 to 2 and each ring carbon bears at most one monovalent substituent.

The new nitrogen-containing heterocyclic compounds of this invention are obtained by reacting under anhydrous conditions in the presence of an acid, an acidic sulfhydryl compound with a dinitrile which is free from active hydrogen and is generally hydrocarbon other than the cyano groups or any ether groups present and has the cyano groups separated by a chain of two to three aliphatic carbon atoms, each bearing at least one hydrogen atom. The acidic sulfhydryl compound can be hydrogen sulfide or an acyl sulfhydryl compound, such as thiolacetic acid.

The compounds of this invention are basic and are readily obtained as their acid salts. Thus, the compounds of this invention include the acid salts thereof, particularly of the halogen acids.

The following examples illustrate the preparation of the compounds of this invention. The parts are by weight.

EXAMPLE I

*Preparation of 2-imino-5-thioxopyrrolidine hydrochloride from beta-cyanothiopropionamide*

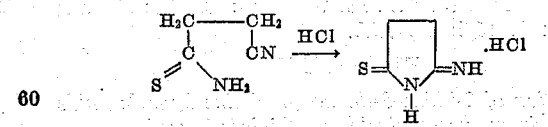

Dry hydrogen chloride gas was passed into a solution of 10 parts beta-cyanothiopropionamide in 84 parts of dry tetrahydrofuran at —5°C. A solid formed and the temperature rose rapidly to 15° C. The mixture thickened and 72 parts of diethyl ether was added. After standing one week at 5° C., the solid was collected by filtration and amounted to 12 parts when dried. A sample was washed with anhydrous ether, dried at 60° C. under 1 mm. pressure. The compound was insoluble in benzene and ether. It was very hygroscopic. Infrared showed no cyano groups present.

*Analysis.*—Calcd. for $C_4H_6N_2S \cdot 1.2HCl$: C, 30.4; H, 4.56; N, 17.7; S, 20.3; Cl, 27.1. Found: C, 30.6; H, 5.30; N, 17.2; S, 18.4; Cl, 24.3.

The beta-cyanothiopropionamide was prepared as follows: Through a mixture of 200 parts of succinonitrile, 320 parts of absolute ethanol, and 15 parts of triethanolamine was passed hydrogen sulfide for 5 hours. The dark brown solution was neutralized with conc. hydrochloric acid and the triethanolamine hydrochloride solid removed by filtration. The ethanol was removed by evaporation under 1 mm. pressure at 30° C. A peanut butter-like mass resulted upon filtration which was extracted twice with 300 parts of chloroform. The residue was recrystallized from ether. There resulted 70 parts (25% of theory) of pale yellow solid, M. P. 63° C.

*Analysis.*—Calcd. for $C_4H_6N_2S$: C, 42.08; H, 5.42; N, 24.54; S, 28.08. Found: C, 42.28; H, 5.35; N, 24.49; S, 28.48.

EXAMPLE II

*Preparation of 2-imino-5-thioxopyrrolidine hydrochloride from succinonitrile and thiolacetic acid*

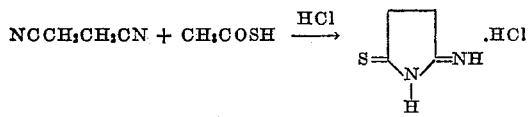

Dry hydrogen chloride gas was bubbled through a solution of 80 parts of succinonitrile, 76.1 parts of thiolacetic acid, and about 150 parts of pure tetrahydrofuran and after the mixture was saturated with hydrogen chloride at 20° C., the mixture was stored for 6 days at room temperature. There resulted 160 parts of pale yellow, very hygroscopic solid. A sample was washed with ether and dried at 25° C. under 1 mm. pressure.

*Analysis.*—Calcd. for $C_4H_6N_2S \cdot 1.3HCl$: C, 29.7; H, 4.52; S, 19.8; Cl, 28.6. Found: C, 29.8; H, 4.91; S, 19.8; Cl, 28.3.

EXAMPLE III

*Preparation of 2-imino-6-thioxopiperidine hydrochloride from glutaronitrile and mercaptoacetic acid*

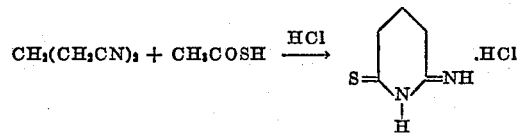

A solution of 22.8 parts of mercaptoacetic acid and 28.2 parts of glutaronitrile in about 60 parts of pure tetrahydrofuran was saturated with anhydrous hydrogen chloride at 0° C. After the solution was saturated, a pale yellow solid began to form with the evolution of heat. The solid (50 parts) was collected after 6 days' storage at 5° C. A small sample was washed with ether and dried for 3 hours at 25° C. under 1 mm. pressure.

*Analysis.*—Calcd. for $C_5H_8N_2S \cdot 1.8HCl$: C, 31.0; H, 5.07; N, 14.5; S, 16.6; Cl, 33.1. Found: C, 31.2; H, 5.08; N, 14.2; S, 16.4; Cl, 32.2.

EXAMPLE IV

*Preparation of 2-imino-5-thioxopyrrolidine hydrobromide from succinonitrile and thiolacetic acid*

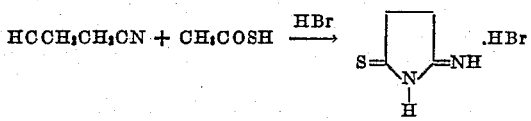

Dry hydrogen bromide was passed through a solution of 16 parts of succinonitrile and 15.2 parts of thiolacetic acid in about 100 parts of dry dioxane. Immediately, a pale yellow precipitate began to form which was collected after standing 3 days. The weight was 34 parts. A sample was dried under 1 mm. pressure at 56° C.

*Analysis.*—Calcd. for $C_4H_6N_2S \cdot 2HBr$: C, 17.4; H, 2.55; N, 10.2; S, 11.6; Br, 57.2. Found: C, 19.2; H, 3.69; N, 10.5; S, 10.7; Br, 53.5.

This product reacted with benzaldehyde in methyl alcohol at 15–30° C. to give, in a few minutes, a white crystalline solid which proved to be the trimer of thiobenzaldehyde.

EXAMPLE V

*Preparation of 2-imino-6-thioxopiperidine hydrobromide from glutaronitrile and thiolacetic acid*

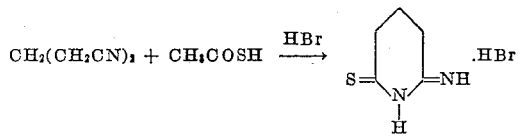

Dry hydrogen bromide was passed through a solution of 18.8 parts of glutaronitrile and 15.2 parts of thiolacetic acid in about 100 parts of dioxane. Immediately, a precipitate was formed which was collected after standing overnight. There was obtained a total of 24 parts.

*Analysis.*—Calcd. for $C_5H_8N_2S \cdot 1.5HBr$: C, 25.0; H, 3.82; N, 11.2; S, 12.8; Br, 48.3. Found: C, 23.5; H, 4.23; N, 11.1; S, 10.8; Br, 47.5.

The infrared spectrum of a sample of this product after recrystallization from alcohol was similar to that of Example III.

The trimer of thiobenzaldehyde crystallized from benzene, M. P. 235–236° C., was obtained upon treatment of the piperidine with benzaldehyde.

*Analysis.*—Calcd. for $C_{27}H_{24}S_3$, $$[(\phi CH)_3 \cdot C_6H_6]$$

C, 73.0; H, 5.4; S, 21.6. Found: C, 73.1; H, 5.5; S, 22.1.

EXAMPLE VI

*Preparation of 2-imino-3 (or 4)-phenyl-5-thioxopyrrolidine hydrochloride from 2-phenylsuccinonitrile and thiolacetic acid*

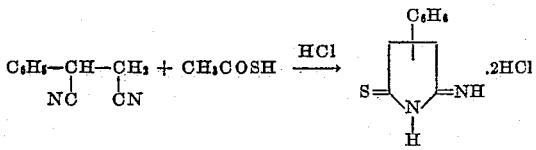

To a solution of 4.68 parts (0.03 mole) of 2-phenylsuccinonitrile (prepared according to Mowry, J. Am. Chem. Soc. 62, 2108 (1946)) and 2.28 parts of thiolacetic acid in 160 parts absolute ethanol was added dry hydrogen chloride gas keeping the temperature between 15–20° C. After one week at room temperature, 3.4 parts of product resulted. A sample was washed with ether and dried at 56° C. under 1 mm.

*Analysis.*—Calcd. for $C_{10}H_{10}N_2S \cdot 2HCl$: C, 45.6; H, 4.6; N, 10.6; S, 12.2; Cl, 26.9. Found: C, 46.2; H, 4.7; N, 10.0; S, 11.8; Cl, 25.7.

EXAMPLE VII

*Preparation of 2-imino-3 (or 5)-phenyl-6-thioxopiperidine hydrochloride from 2-phenylglutaronitrile and thiolacetic acid*

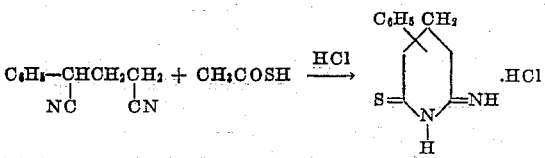

Dry hydrogen chloride was passed through a solution of 17 parts of 2-phenylglutaronitrile (obtained according to the process of Campbell, J. Chem. Soc. 1954, 1379) and 7.6 parts of thiolacetic acid in 160 parts of absolute ether. The mixture was stirred and cooled in an ice bath. In a few minutes a cream-colored solid began to form. After standing for about 16 hours the solid was removed by filtration. The solid amounted to 19 parts. A sample was dried at room temperature under vacuum.

*Analysis.*—Calcd. for $C_{11}H_{12}N_2S \cdot \tfrac{1}{2}HCl$: C, 59.5; H, 5.62; N, 12.6; S, 14.4; Cl, 7.98. Found: C, 58.5; H, 5.89; N, 12.4; S, 16.1; Cl, 7.50.

EXAMPLE VIII

*Preparation of methylmercapto-2-imino-5-thioxopyrrolidine hydrochloride from methylmercaptosuccinonitrile and thiolacetic acid*

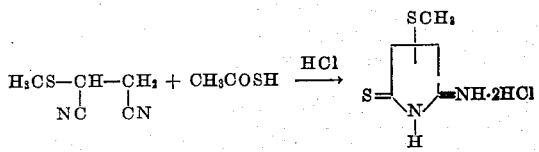

A solution of 18.9 parts of methylmercaptosuccinonitrile and 11.4 parts of thiolacetic acid in 143 parts of absolute ether was saturated at 25° C. with dry hydrogen chloride for 3 days. There resulted 25 parts of white solid which was washed with ether and dried.

*Analysis.*—Calcd. for $C_5H_{10}N_2S_2Cl_2$: C, 25.62; H, 4.32; N, 12.02; S, 27.50; Cl, 30.41. Found: C, 27.22; H, 4.85; N, 11.99; S, 27.35; Cl, 30.19.

The methylmercaptosuccinonitrile was prepared as follows: A few drops of piperidine was added to a mixture of 7.8 parts of fumaronitrile, 78 parts of tert-butyl alcohol, and 10 parts of methyl mercaptan. The mixture became warm and the dinitrile dissolved. On distillation there was obtained 10 parts of methylmercaptosuccinonitrile boiling at 107–115° C. under 0.9 mm. pressure. A sample upon recrystallization from ethyl alcohol melted at 38–38.5° C.

*Analysis.*—Calcd for $C_5H_6N_2S$: C, 47.59; H, 4.79; N, 22.21; S, 25.41. Found: C, 47.52; H, 4.75; N, 21.90; S, 25.20.

The new compounds of this invention are nitrogen-containing heterocyclic compounds represented by the formula

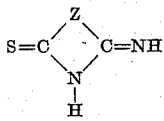

wherein Z is a diradical, free from active hydrogen, having an aliphatic chain of two to three carbon atoms each bearing at least one hydrogen atom, the ring carbons adjacent to ring nitrogen being separated by said aliphatic chain of two to three carbon atoms and forming therewith a five to six-membered heterocyclic ring.

These nitrogen-containing heterocyclic compounds can be formulated as pyrrolidines or piperidines although it should be pointed out that the tautomeric structures, namely the pyrrole and dihydropyridine, probably contribute to the properties of these compounds. Thus, the compounds of Example I can exist as both the pyrrolidine and pyrrole

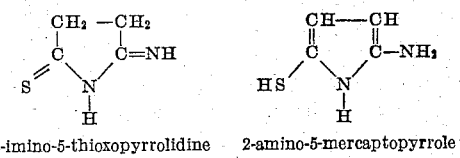

2-imino-5-thioxopyrrolidine   2-amino-5-mercaptopyrrole

In the pyrrolidine structure, the ring carbon in the 2-position bears an imino group and the ring carbon in the 5-position bears a sulfur atom whereas in the tautomeric pyrrole structure, the ring carbon in the 2-position bears an amino group and the ring carbon in the 5-position bears a mercapto group.

The product of Example III can exist as both the piperidine and dihydropyridine

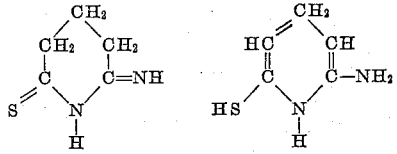

2-imino-6-thioxopiperidine   2-amino-6-mercaptodihydropyridine

In the piperidine structure, the ring carbon in the 2-position bears an imino group and the ring carbon in the 6-position bears a sulfur atom whereas in the tautomeric pyridine structure, the ring carbon in the 2-position bears an amino group and the ring carbon in the 6-position bears a mercapto group.

Although these compounds are conveniently named as the pyrrolidines and piperidines, the isomeric aminomercaptopyrroles and aminomercaptodihydropyridines are tautomeric structures and contribute to the properties of the new compounds. However, for convenience the compounds have been named on the basis of the saturated ring system.

The compounds thus include, in addition to those of the examples, salts of 2-imino-3-tolyl-6-thioxopiperidine, 2-imino-3,5-dimethyl-4-phenyl - 6 - thioxopiperidine, 2-imino-3-ethyl-5-thioxopyrrolidine, 2-imino - 3 - methoxy-6-thioxopiperidine, 2-imino-3-ethylmercapto - 6 - thioxopiperidine, 2-imino-3-ethoxy-5-thioxopyrrolidine, 2-imino-3-ethyl-4-methyl-5-thioxopyrrolidine, and 2-imino-3-n-butyl-6-thioxopiperidine. These compounds are obtained preferably by the process of Examples II–VI starting with the following dinitriles: 2-tolylglutaronitrile, 1,3-dimethyl-2-phenylglutaronitrile, ethyl succinonitrile, 2-methoxyglutaronitrile, 2-ethylmercaptoglutaronitrile, 2-ethoxysuccinonitrile, 1-ethyl-2-methyl succinonitrile, and 2-n-butylglutaronitrile, respectively.

The compounds of this invention are generally obtained as their salts with strong acids and preferably salts of hydrogen halides, such as the chloride and bromide. Any acid having a pKa of less than 1.5 is useful, e. g., dichloroacetic acid, sulfuric acid, and the like, to form the salts. Particularly preferred are the inorganic acids and of these, the strong, non-oxidizing mineral acids are most useful. The salts are more stable than the pyrrolidines and piperidines themselves. In addition to hydrogen halide salts, phosphoric acid salts are particularly useful.

The dinitriles can have one hydrocarbon substituent or contain ether or thioether groupings of up to seven or eight carbons on each chain carbon and preferably have no more than one alkyl, alkoxy, alkylthio or aryl substituent. The dinitriles have at least one hydrogen on each of the methylene carbons. The dinitriles are free from active hydrogen.

The sulfhydryl compounds employed in this process are acyl sulfhydryls such as a thiolalkanoic acid of up to 4 carbons, including thiolacetic, thiolpropionic, and thiolbutyric acid. The reaction is conducted under anhydrous conditions in the presence of an acid of pKa of not more than 1.5 and generally of a hydrogen halide. The reaction involves substantially molar ratios of the sulfhydryl compound and the dinitrile and for optimum yields based on both starting materials the relative amounts should approach such proportions.

The acid employed should be present in amounts of at least one mol and preferably at least two mols per mol of new pyrrolidine or piperidine formed. The acid salts are more stable than the basic heterocyclic compounds themselves. Accordingly, it is preferred that the compounds be isolated and employed where possible as the acid salts. However, the free base can be obtained and used by generation of it from a salt in a reaction medium, when desired. For example, a solution of the free base is obtained by treatment of a cold solution of an acid salt with an ion exchange resin or with a cold solution of the calculated amount of a sodium alkoxide.

Alternately the new compounds of this invention can be obtained by the general process illustrated by Example I, namely, by the reaction of a dinitrile, which is free from active hydrogen (Zerewitinoff) and generally is wholly hydrocarbon other than oxygen ether or thioether linkages and the cyano groups, and has the cyano groups separated by a chain of two to three aliphatic carbon atoms each bearing at least one hydrogen atom with a sulfhydryl compound, such as hydrogen sulfide, under basic conditions to produce a cyanothioamide, i. e., beta-cyanothiopropionamide or a gamma-cyanothiobutyramide, which in turn is transformed under acidic conditions to the corresponding pyrrolidine or piperidine. In this process the formation of the intermediate requires the presence of a basic compound such as a tertiary amine, such as triethanolamine. Anhydrous basic conditions are preferred in the preparation of the intermediate.

The preparations thus described are generally conducted at temperatures of the order of 0–50° C. and at times of a few minutes to several days.

The compounds of this invention exhibit fungicidal and antibactericidal properties and are useful in the formulation of fungicides and antibacterial compositions. For example, the products of Examples I and III inhibit the growth of *Micrococcus pyogenes* var. *aureus*, H strain; *Streptococcus faecalis*, 10Cl; *Escherichia coli*, 6A; and *pseudomonas aeruginosa*, Temple strain, at concentrations generally less than 250 micrograms per milliliter of water.

The preventive fungitoxic activity of the compounds of this invention is illustrated as follows:

The hydrochloride of 2-imino-6-thioxopiperidine was dissolved in water to form a 0.2% solution which was sprayed onto tomato foliage. After the deposit had dried, the foliage was inoculated with the early blight fungus (*Alernaria solani*). Lesion counts were made three days after the inoculation. It was found that only about 2% disease occurred as compared to substantially 100% in a control.

The compounds of this invention are also useful as antioxidants.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound selected from the class consisting of the free bases and acid salts of nitrogen-containing heterocyclic compounds having a five to six membered heterocyclic ring consisting of carbon atoms and one nitrogen atom wherein the ring carbons bonded to ring nitrogen are singly bonded thereto and bear respectively an exocyclic =NH group and an exocyclic =S atom each doubly bonded to their respective ring carbon atoms, and the remaining ring carbons are saturated and each bears at least one hydrogen atom and at most one monovalent substituent of not more than 8 carbon atoms which is free from aliphatic unsaturation and is selected from the class consisting of hydrocarbon, alkoxy and alkylthio radicals.

2. A nitrogen-containing heterocyclic compound having a five to six membered heterocyclic ring consisting of carbon atoms and one nitrogen atom wherein the ring carbons bonded to ring nitrogen are singly bonded thereto and bear respectively an exocyclic =NH group and an exocyclic =S atom each doubly bonded to their respective ring carbon atoms, and each of the remaining ring carbons bears two hydrogen atoms.

3. A nitrogen-containing heterocyclic compound having a five membered heterocyclic ring consisting of carbon atoms and one nitrogen atom wherein the ring carbons bonded to ring nitrogen are singly bonded thereto and bear respectively an exocyclic =NH group and an exocyclic =S atom each doubly bonded to their respective ring carbon atoms, and each of the remaining ring carbons bears two hydrogen atoms.

4. A nitrogen-containing heterocyclic compound having a six membered heterocyclic ring consisting of carbon atoms and one nitrogen atom wherein the ring carbons bonded to ring nitrogen are singly bonded thereto and bear respectively an exocyclic =NH group and an exocyclic =S atom each doubly bonded to their respective ring carbon atoms, and each of the remaining ring carbons bears two hydrogen atoms.

5. A nitrogen-containing heterocyclic compound having a five to six membered heterocyclic ring consisting of carbon atoms and one nitrogen atom wherein the ring carbons bonded to ring nitrogen are singly bonded thereto and bear respectively an exocyclic =NH group and an exocyclic =S atom each doubly bonded to their respective ring carbon atoms, and one of the remaining ring carbons bears a hydrogen atom and a monovalent hydrocarbon radical of not more than 8 carbon atoms which is free from aliphatic unsaturation, and each of the other remaining ring carbons bears two hydrogen atoms.

6. A nitrogen-containing heterocyclic compound having a six membered heterocyclic ring consisting of carbon atoms and one nitrogen atom wherein the ring carbons bonded to ring nitrogen are singly bonded thereto and bear respectively an exocyclic =NH group and an exocyclic =S atom each doubly bonded to their respective ring carbon atoms, and one of the remaining ring carbons bears a hydrogen atom and a monovalent hydrocarbon radical of not more than 8 carbon atoms which is free from aliphatic unsaturation, and each of the other remaining ring carbons bears two hydrogen atoms.

7. A 2-imino-phenyl-substituted-6-thioxopiperidine having the formula

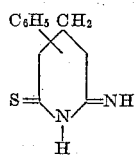

8. 2-imino-6-thioxopiperidine.
9. An acid salt of 2-imino-6-thioxopiperidine.
10. 2-imino-6-thioxopiperidine hydrochloride.
11. 2-imino-5-thioxopyrrolidine.
12. An acid salt of 2-imino-5-thioxopyrrolidine.
13. 2-imino-5-thioxopyrrolidine hydrochloride.
14. Process for preparing nitrogen-containing heterocyclic compounds which comprises reacting at a temperature of 0 to 50° C., under anhydrous conditions in contact with at least one molar proportion of an acid having a pKa less than 1.5, substantially equal molar quantities of an acyl sulfhydryl compound and a dinitrile which is free from active hydrogen and has the nitrile groups separated by a chain of two to three saturated aliphatic carbon atoms each of which bears at least one hydrogen and at most one monovalent substituent of not more than 8 carbon atoms which is free from aliphatic unsaturation and is selected from the class consisting of hydrocarbon, alkoxy and alkylthio radicals.

15. Process for preparing nitrogen-containing heterocyclic compounds which comprises reacting at a temperature of 0 to 50° C., under basic conditions, substantially equal molar quantities of hydrogen sulfide and a dinitrile which is free from active hydrogen and has the nitrile groups separated by a chain of two to three saturated aliphatic carbon atoms each of which bears at least one hydrogen atom and at most one monovalent substituent of not more than 8 carbon atoms which is free from aliphatic unsaturation and is selected from the class consisting of hydrocarbon, alkoxy and alkylthio radicals, thereby forming a cyanothioamide, and subjecting said cyanothioamide, under anhydrous conditions, to contact at a temperature of 0 to 50° C. with at least one molar proportion of an acid having a pKa of less than 1.5, thereby transforming said cyanothioamide to a nitrogen-containing heterocyclic compound.

16. Process for preparing nitrogen-containing heterocyclic compounds which comprises reacting at a temperature of 0 to 50° C., under anhydrous conditions in contact with at least one molar proportion of an anhydrous hydrogen halide, substantially equal molar quantities of a thiolalkanoic acid of up to 4 carbon atoms and a dinitrile having the nitrile groups separated by a chain of two to three saturated aliphatic carbon atoms each of which bears at least one hydrogen atom and at most one monovalent substituent of not more than 8 carbon atoms which is free from aliphatic unsaturation and is selected from the class consisting of hydrocarbon, alkoxy and alkylthio radicals.

17. Process for preparing nitrogen-containing heterocyclic compounds which comprises reacting at a temperature of 0 to 50° C., under anhydrous conditions in contact with at least one molar proportion of an anhydrous hydrogen halide, substantially equal molar quantities of a thiolalkanoic acid of up to four carbon atoms and a dinitrile having the nitrile groups separated by a chain of two to three saturated aliphatic carbon atoms each of which bears two hydrogen atoms.

18. Process for preparing nitrogen-containing heterocyclic compounds which comprises reacting at a temperature of 0 to 50° C., under anhydrous conditions in contact with at least one molar proportion of an anhydrous hydrogen halide, substantially equal molar quantities of a thiolalkanoic acid of up to four carbon atoms and a dinitrile having the nitrile groups separated by a chain of two to three saturated aliphatic carbon atoms, one of which bears a hydrogen atom and a monovalent hydrocarbon radical of not more than 8 carbon atoms which is free from aliphatic unsaturation, and each of the other of said saturated aliphatic carbon atoms bears two hydrogen atoms.

19. Process for preparing 2-imino-6-thioxopiperidine which comprises reacting at a temperature of 0 to 50° C., under anhydrous conditions in contact with at least one molar proportion of an anhydrous hydrogen halide, substantially equal molar quantities of thiolacetic acid and glutaronitrile.

20. Process for preparing 2-imino-5-thioxopyrrolidine which comprises reacting at a temperature of 0 to 50° C., under anhydrous conditions in contact with at least one molar proportion of an anhydrous hydrogen halide, substantially equal molar quantities of thiolacetic acid and succinonitrile.

21. Process for preparing a 2-imino-phenyl-substituted-6-thioxopiperidine which comprises reacting at a temperature of 0 to 50° C., under anhydrous conditions in contact with at least one molar proportion of an anhydrous hydrogen halide, substantially equal molar quantities of thiolacetic acid and 2-phenyl-glutaronitrile.

References Cited in the file of this patent
FOREIGN PATENTS
380,083   Great Britain ------------------ 1932

UNITED STATES PATENT OFFICE

Certificate of Correction

Patent No. 2,841,588

July 1, 1958

Edward G. Howard, Jr.

It is hereby certified that error appears in the printed specification of the above numbered patent requiring correction and that the said Letters Patent should read as corrected below.

Column 1, line 39, for "heretocyclic" read —heterocyclic—; column 6, lines 5 to 11, inclusive, right-hand formula should read as shown below instead of as in the patent—

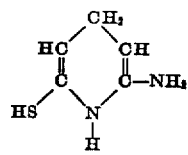

column 6, line 61, for "an" read —an- —.

Signed and sealed this 14th day of October 1958.

[SEAL]

Attest:
KARL H. AXLINE,
*Attesting Officer.*

ROBERT C. WATSON,
*Commissioner of Patents.*